United States Patent [19]

Otsuka et al.

[11] 3,896,152

[45] July 22, 1975

[54] AZIDES

[75] Inventors: Hideo Otsuka, Osaka; Ken Inouye, Kobe, both of Japan

[73] Assignee: Shionogi & Co., Ltd., Osaka, Japan

[22] Filed: Jan. 8, 1974

[21] Appl. No.: 431,603

Related U.S. Application Data

[62] Division of Ser. No. 266,748, June 27, 1972, Pat. No. 3,839,395.

[30] Foreign Application Priority Data

July 15, 1971 Japan.............................. 46-52707
July 15, 1971 Japan.............................. 46-52708
Aug. 19, 1971 Japan.............................. 46-63182

[52] U.S. Cl............. 260/349; 260/463; 260/471 C; 260/482 C
[51] Int. Cl............................................ C07c 117/00
[58] Field of Search..................................... 260/349

[56] References Cited
UNITED STATES PATENTS

| | | | |
|---|---|---|---|
| 3,211,752 | 10/1965 | Breslow | 260/349 |
| 3,324,148 | 6/1967 | Cotter | 260/349 |
| 3,360,513 | 12/1967 | Cotter | 260/349 X |

*Primary Examiner*—John M. Ford
*Attorney, Agent, or Firm*—Wenderoth, Lind & Ponack

[57] ABSTRACT

A new method for the preparation of peptides using, as an amino-protecting group, 1-alkylcycloalkyloxycarbonyl groups of the general formula:

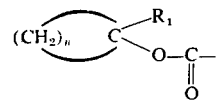

wherein $R_1$ is a lower alkyl group and $n$ is an integer of 4–6, and new amino-protecting reagents of the general formula:

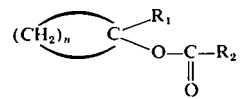

wherein $R_1$ and $n$ have each the same meaning as defined above and $R_2$ is an azide group or a substituted or unsubstituted phenoxy group of the general formula:

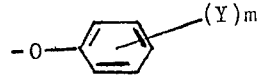

wherein $m$ is an integer of 1–5 and Y is hydrogen, nitro, halogen, hydroxy, cyano, lower alkyl or lower alkoxy.

2 Claims, No Drawings

AZIDES

This is a division of application Ser. No. 266,748, filed June 27, 1972, now U.S. Pat. No. 3,839,395.

This invention relates to a new method for the preparation of peptides using a new amino-protecting group and to new amino-protecting reagents therefor. More particularly, this invention relates to a new method for the preparation of peptides using intermediates in which 1-alkylcycloalkyloxycarbonyl groups (I) of the general formula:

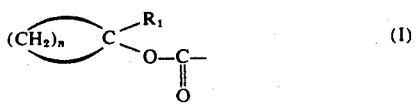

wherein $R_1$ is a lower alkyl group (e.g. methyl, ethyl, propyl) and $n$ is an integer of 4–6, is used as an amino-protecting group, and to new amino-protecting reagents (II) of the general formula:

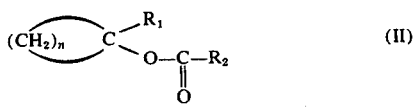

wherein $R_1$ $n$ have each the same meaning as defined above and $R_2$ is a member selected from the group consisting of an azide group and a substituted or unsubstituted phenoxy group of the general formula

wherein $m$ is an integer of 1–5 and Y is selected from a group consisting of hydrogen, nitro, halogen (e.g. fluorine, bromine, chlorine), hydroxy, cyano, lower alkyl (e.g. methyl, ethyl, propyl) and lower alkoxy (e.g. methoxy, ethoxy, propoxy) group.

A peptide synthesis is characterized by the formation of an amide bond between the carboxyl group of one amino acid or peptide and the amino group of a second amino acid or peptide. It requires the protection of functional groups not participating in a desired amide formation, in order to avoid the undesirable formation of by-products. Therefore, a protecting group must fulfill the following requirements: (1) it must afford the protected amino acid or peptide readily and, desirably, in a quantitative yield; (2) it must retain its protecting property, preferably under all coupling conditions; (3) its introduction must not bring about racemization in an amino acid to be protected; (4) it must not give rise to side reactions; and (5) it must be readily and selectively removable in such a way that other protecting groups for the same or other functional groups are not undesirably affected.

As a result of studies on amino-protecting groups, it was discovered by the present inventors that 1-alkylcycloalkyloxycarbonyl groups can be used for protection of an amino group during peptide synthesis, because they meet sufficiently the requirements as hereinbefore set forth. The new amino-protecting groups can be introduced readily into an amino group of amino acids or peptides and they can be easily removed by treatment with an acid at any stage of peptide synthesis. The present invention has been completed on the basis of these observations.

It is, therefore, one object of the invention to provide a new method for the preparation of peptides using a new amino-protecting group. Another object of the invention is to produce new amino-protecting reagents useful in the peptide synthesis. A further object of the invention is to prepare intermediates useful in the preparation of various peptides. These and other objects of the invention will be apparent from the following descriptions.

Generally speaking, the new peptide synthesis in accordance with this invention is carried out by acylating an amino group of an amino acid or peptide with a 1-alkylcycloalkyloxycarbonylating reagent; condensing the resultant N-(1-alkylcycloalkyloxycarbonyl)-compound with an other amino acid or peptide by the known general procedures; and treating the N-(1-alkylcycloalkyloxycarbonyl)-peptide thus obtained with an acid to remove the 1-alkylcycloalkyloxycarbonyl group and produce the correspondidng peptide.

The first step of the peptide synthesis of the invention is effected by acylating a compound (III) of the general formula:

$$H-A \qquad (III)$$

wherein A is a residue formed when one hydrogen atom of an amino acid or peptide is excluded from its amino group, with a 1-alkylcycloalkyloxycarbonyl compound (II) of the general formula:

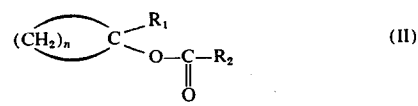

wherein $R_1$ is a lower alkyl group (e.g. methyl, ethyl, propyl); $n$ is an integer of 4–6; and $R_2$ is a member selected from the group consisting of an azide group and a substituted or unsubstituted phenoxy group of the general formula:

wherein $m$ is an integer of 1–5 and Y is a member selected from the group consisting of hydrogen, nitro, halogen (e.g. fluorine, bromine, chlorine), hydroxy, cyano, lower alkyl (e.g. methyl, ethyl, propyl) and lower alkoxy group (e.g. methoxy, ethoxy, propoxy), to obtain an N-(1-alkylcycloalkyloxycarbonyl)-amino acid or -peptide, (IV), of the general formula:

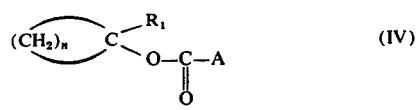

wherein $R_1$, A and $n$ have each the same meaning as defined above.

This acylation with compound II is entirely analogous to the amine-protecting procedures which can be employed for formation of the known N-(benzyloxycarbonyl)- or N-(t-butyloxycarbonyl)-amino acids using a corresponding protecting reagent [cf. Ber. 65, 1192

(1932); Helv.Chim.Acta 42, 2622 (1959); Am.-N.Y.Acad.Sci. 88, 676 (1960)]. Thus, the acylation is usually carried out at 0°–50°C for 1–72 hours, optionally in the presence of a solvent and a base. The solvents which can be used are inorganic solvents (e.g. water) and organic solvents (e.g. methanol, ethanol, dioxane, dimethylformamide, dimethylsulfoxide, acetonitrile, ethyl acetate). Examples of the base suitable for use in accelerating the reaction are alkali metal hydroxides (e.g. sodium hydroxide, potassium hydroxide), alkali metal carbonates (e.g. sodium carbonate, potassium carbonate), alkali metal bicarbonates (e.g. sodium bicarbonate, potassium bicarbonate), alkaline earth metal oxides (e.g. magnesium oxide), organic tertiary amines (e.g. pyridine, quinoline, trimethylamine, triethylamine) and trimethylbenzyl ammonium hydroxide. It is advantageous to use the acylating reagent in an amount equimolar with or in molar excess of, especially a 1.0~1.5-fold mole excess, the amino group to be protected.

The introduction of said amino-protecting group into an amino group can also be carried out by treating a 1-alkylcycloalkanol (V) of the general formula:

wherein $R_1$ is an alkyl group (e.g. methyl, ethyl, propyl) and $n$ is an integer of 4–6, with an isocyanate (VI) of the general formula:

$$O=C=N-R_3 \quad (VI)$$

wherein $R_3$ is a group formed when the amino group is excluded from an amino acid ester, to give an N-(1-alkylcycloalkyloxycarbonyl)-compound (VII) of the general formula:

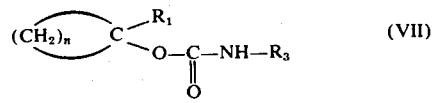

wherein $R_1$, $n$ and $R_3$ have each the same meaning as defined above.

This isocyanate reaction is also analogous to the known methods [Z.Naturforsch. 5b, 170 (1950); Ann.-Chem.Liebigs 575, 217 (1952)]. The reaction is usually carried out in a suitable solvent at a temperature of 50°–130°C for 0.5–6 hours, optionally in the presence of an organic base. The solvents suitable for use are benzene, toluene, xylene, anisol, isopropyl ether and the like. The preferable organic bases are pyridine, triethylamine, collidine, and quinoline and they may serve as the solvent.

The isocyanate compound (VI) as the starting material can be prepared by treating an amino acid ester with phosgene in a conventional manner [Ann.Chem.-Liebigs 575, 217 (1952)]. The preferable amino acid esters are the lower alkyl esters (e.g. methyl ester, ethyl ester, propyl ester) and the lower aralkyl esters (e.g. benzyl ester, p-nitrobenzyl ester).

Examples of amino acids available in the present peptide synthesis are glycine, alanine, valine, norvaline, leucine, norleucine, isoleucine, serine, threonine, cysteine, cystine, methionine, aspartic acid, asparagine, glutamic acid, glutamine, lysine, ornithine, citruline, arginine, phenylalanine, tyrosine, histidine, tryptophan, proline, hydroxyproline, β-alanine, γ-aminobutyric acid, α-aminoisobutyric acid, sarcosine, α,β-diaminopropionic acid, α,γ-diaminobutyric acid and other naturally occurring or synthetic amino acids. These amino acids may be of the L-, D- or DL-configuration. It is to be noted that when amino acids or peptides to be protected with the 1-alkylcycloalkyloxycarbonyl group contain functional groups not participating in the reaction, such as amino, carboxyl, hydroxy, mercapto, guanidino or imino group, the said functional groups may, if necessary, be protected with suitable known protecting groups usually employed in the field of peptide chemistry. That is, a carboxyl group is preferably protected by esterification, for example, with methanol, ethanol, tertiary butanol, benzyl alcohol, p-nitrobenzyl alcohol, phenols or by amide formation; and an amino group for example, by introducing a benzyloxycarbonyl, p-nitrobenzyloxycarbonyl, p-bromobenzyloxycarbonyl, t-butyloxycarbonyl, t-amyloxycarbonyl, p-methoxybenzyloxycarbonyl, 2-(p-diphenyl)-isopropyloxycarbonyl, trityl, tosyl or formyl group. The hydroxy group of tyrosine and serine may be masked by an acetyl, benzyl, or t-butyl group; the mercapto group of cysteine by a benzyl, p-methoxybenzyl, or sulfenyl group; the guanidino group of arginine by a nitro, or tosyl group; and the imino group of histidine by a benzyl, benzyloxycarbonyl, tosyl, or t-butyloxycarbonyl group. These known protecting groups can be removed by hydrolysis, reduction or acidolysis in a conventional manner.

The second step of the present peptide synthesis is a coupling reaction between the N-(1-alkylcycloalkyloxycarbonyl)-compound, IV or VII, and an other amino acid or peptide. A new peptide containing 1-alkylcycloalkyloxycarbonyl group as an amino-protecting group can be prepared by condensing compound IV or VII with an other amino acid or peptide by known general methods. The coupling method used in this condensation is preferably the carbodiimide method [J.Am.Chem.Soc. 77, 1067 (1955); ibid. 78, 1367 (1956)], the carbonyldiimidazole method [Ann. 609, 75 (1957)], the activated ester method (e.g. p-nitrophenyl ester, N-hydroxysuccinimide ester, pentachlorophenyl ester, cyanomethyl ester or p-nitrophenyl thiolester method) [Nature 175, 685 (1955); Helv.-Chim.Acta 40, 373 (1957); J.Am. Chem.Soc. 86, 1839 (1966); Chem.Abstract 57, 7373 (1962); Helv.Chim.Acta 38, 80 (1955); Ann. 533, 99 (1962); Helv.Chim.Acta 39, 872 (1956)], the azide method [j.Prakt.-Chem.70, 73, 89 (1904); Collection Czechoslov.-Chem.Communs. 26, 2333 (1961)] or the mixed anhydride method [J.Am.Chem.Soc. 74, 676 (1952)]. Peptides having an amino group protected with said amino-protecting group can also be prepared by the so-called solid phase synthesis [J.Am.Chem.Soc. 85, 2149 (1964)]. If necessary, the functional groups not participating in the coupling reaction, of the amino acids or peptides to be reacted with the N-(1-alkylcycloalkyloxycarboxyl)-compound can be protected by the known protecting groups as mentioned above. In this coupling reaction, it is to be noted that when the N-(1-alkylcycloalkyloxycarbonyl)-compound obtained via the acylation procedure as described above is an ester form, the ester is once hydrolysed by the usual method using an alkali and then the resultant N-acylated free acid as a carboxyl component is condensed with other amino acid or peptide as an amine component by the known methods. On the other hand, in the case where the N-(1-alkylcycloalkyloxycarbonyl)-compound is an N-acylated free acid, it can be submitted, without hydrolysis procedures, to the subsequent peptide synthesis. Further, when ω-amino group of basic amino acids such as lysine or ornithine is acylated with the said amino-protecting reagent, the resultant $N^\omega$-acylated product can be employed as an amine component in the coupling reaction, regardless of its ester form. Thus repeated coupling reactions give a desired longer-chain peptide.

At the last or any stage of the peptide synthesis, the 1-alkylcycloalkyloxycarbonyl group is cleaved from the protected amino acid or peptide by treatment with an acid. The removal of the 1-alkylcycloalkyloxycarbonyl group is carried out by treating a solution or suspension of the N-(1-alkylcycloalkyloxycarbonyl)-amino acid or -peptide with an organic or inorganic acid. The acid used in this reaction with or without an appropriate solvent (organic solvent or water) can be, for example, hydrogen halide (e.g. hydrogen fluoride, hydrogen bromide, hydrogen chloride), sulfuric acid, phosphoric acid, trifluoroacetic acid, acetic acid, formic acid, monochloroacetic acid, methanesulfonic acid, p-toluenesulfonic acid or a mixture thereof. When these acids are employed, the reaction proceeds smoothly at room temperature with evolution of carbon dioxide. Usually the removal of the 1-alkylcycloalkyloxycarbonyl group is complete within 30 minutes to 120 minutes at 0°–60°C. It is usually preferred to effect the protecting group removal at low or moderate temperature since as is well known many peptides have a tendency to be adversely affected by an elevated temperature. For this reason and since heating is unnecessary, the removal of said protecting group is advantageously conducted at 0–30°C, especially near room temperature. The acid medium may be employed in admixture with a solvent which does not interfere with the reaction, such as water, methanol, dichloromethane, acetic acid, ethyl acetate or acetonitrile. The acid used for the protecting group removal is usually employed in an excess, e.g. in 2~10-fold molar excess, of the amino acid or peptide to be deblocked.

The N-(1-alkylcycloalkyloxycarbonyl)-amino acids or -peptides obtained in the above-described procedure are novel and valuable intermediates for the preparation of biologically active polypeptides, e.g. ACTH peptides, and constitute one aspect of the invention. Since the 1-alkylcycloalkyloxycarbonyl group is resistant to catalytic hydrogenation by which benzyloxycarbonyl group which is known as a typical amino-protecting group can be readily removed, this invention provides means for preferentially removing one of two types of amino-protecting groups. Thus, for example, in an amino acid or peptide containing two amino groups which are to be blocked, the 1-alkylcycloalkyloxycarbonyl group can be used for the protection of one amino group and the benzyloxycarbonyl group for the other; the latter can be removed by hydrogenolysis, which does not affect the present amino-protecting group, and the 1-alkylcycloalkyloxycarbonyl group can subsequently be removed by treatment with an acid. Also, since the amino-protecting group of the invention is stable under alkali conditions, saponification procedures of esters of amino acids of peptides can be made without affecting the group. This is an especially advantageous feature of the present invention. Further, the amino-protecting groups of the invention can be readily introduced into an amino group of amino acids or peptides in a satisfactory yield without the occurrence of side reactions and racemizations. They retain their protecting properties during coupling conditions.

On the other hand, according to one aspect of the invention, the N-acylating reagents, II, can be prepared by reacting a 1-alkylcycloalkanol (V) of the general formula:

(V)

wherein $R_1$ is a lower alkyl group (e.g. methyl, ethyl, propyl) and $n$ is an integer of 4–6, with a haloformate (VIII) of the general formula:

(VIII)

wherein X is a halogen atom (e.g. fluorine, bromine, chlorine) and $R_4$ is a substituted or unsubstituted phenyl group of the general formula:

wherein $m$ is an integer of 1–5 and Y is a member selected from the group consisting of hydrogen, nitro, halogen (e.g. fluorine, bromine, chlorine), hydroxy, cyano, lower alkyl, (e.g. methyl, ethyl, propyl) and lower alkoxy (e.g. methoxy, ethoxy, propoxy) group, to give a carbonate (IX) of the general formula:

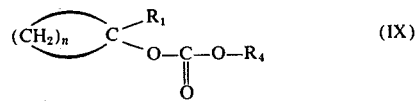

(IX)

wherein $R_1$, $R_4$ and $n$ have each the same meaning as defined above; or by reacting the resultant compound (IX) with hydrazine and treating the resultant carbazate (X) of the general formula:

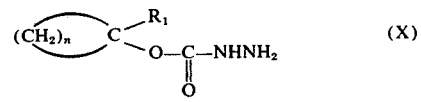

(X)

wherein $R_1$ and $n$ have each the same meaning as defined above, with a nitrite (XI) of the general formula:
$R_5$—$NO_2$ (XI)
wherein $R_5$ is a member selected from the group consisting of hydrogen atom, lower alkyl group (e.g. isoamyl, t-butyl) and alkali metal (e.g. sodium, potassium), in an acid medium, to give an azidoformate (XII) of the general formula:

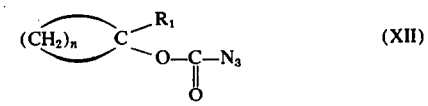

(XII)

wherein $R_1$ and $n$ have each the same meaning as defined above.

The reaction between compounds (V) and (VIII) is carried out in a suitable organic solvent in the presence of a base at −10°C to 50°C for 1–24 hours; thus yielding compound (IX). The preferable solvents which can be used are dichloromethane and chloroform. The base suitable for use is, for example, an organic base such as pyridine, quinoline, dimethylaniline, or triethylamine.

The reaction between compounds (IX) and hydrazine is performed in the absence or presence of a solvent at 0°–100°C for 0.5–24 hours; thus yielding compound (X). The preferable amount of hydrazine is 1~2 moles per mole of compound (IX). When this reaction is effected in the presence of a solvent, it is preferred to use a polar solvent such as an alcohol (e.g. methanol, ethanol, propanol, butanol), dimethylformamide or dimethylsulfoxide.

The reaction between compounds (X) and (XI) is conducted in a suitable solvent in the presence of an acid medium at a temperature of −40°C to room temperature (10°–30°C) for from several minutes (3–5 minutes) to several hours (3–5 hours); thus yielding compound (XII). Preferable solvents are, for example, acetic acid, acetonitrile, dimethylformamide or an aqueous solvent thereof. It is preferred to use, as an acid meidum, inorganic acids (e.g. hydrochloric acid) or organic acids (e.g. acetic acid). For convenience the azidoformate (XII) is usually used without isolation in the subsequent acylation step as hereinbefore described. Compound (XII) may, however, be vacuum-distilled for purification.

The starting material, V, can be prepared, for example, by treating a corresponding 1-alkylcycloalkanone (XIII) of the general formula:

 (XIII)

wherein $n$ is an integer of 4–6, with a Grignard reagent (XIV) of the general formula:

 (XIV)

wherein $R_1$ is a lower alkyl group (e.g. methyl, ethyl, propyl) and X is a halogen atom (e.g. fluorine, bromine, chlorine, iodine), and hydrolysing the resultant product in a conventional manner.

The other starting material, VIII, can be prepared, for example, by treating a corresponding aryl alcohol with phosgene or carbonyl chloride halide in the usual method.

The N-acylating reagents IX and XII(=II) thus obtained are very useful for the protection of an amino group of amino acids or peptides. In addition to amino-protection, the said reagents may be used for protection of other functional groups such as the hydroxy group of tyrosine and the thiol group of cysteine.

The following examples are intended to illustrate the invention and are not to be construed as being limitations thereon, many variations of which are possible.

EXAMPLES

I: 1-Alkylcycloalkyloxycarbonylating reagents

EXAMPLE 1

Preparation of 1-methylcyclohexyl phenyl carbonate

1-Methylcyclohexanol (22.8 g) was dissolved in dichloromethane (100 ml) and to the solution was added pyridine (32.4 ml). The solution was chilled in an ice bath and to it was added dropwise a solution of phenyl chloroformate (31.3 g) in dichloromethane (100 ml). The mixture was stirred at 0°C for 2.5 hours and allowed to stand at room temperature overnight. The resultant solution was washed with water (20 ml × 3), dried over magnesium sulfate and evaporated under reduced pressure to give 1-methylcyclohexyl phenyl carbonate as an oil; yield 43 g, Rf 0.77 in thin-layer chromatography on silica gel with a solvent system of benzene:ethyl acetate (1:1 by volume).

EXAMPLE 2

Preparation of 1-methylcyclohexyl p-nitrophenyl carbonate

1-Methylcyclohexanol (22.8 g) was dissolved in dichloromethane (100 ml) and to the solution was added pyridine (32.4 ml). The solution was chilled in ice and to it was added dropwise a solution of p-nitrophenyl chloroformate (40.3 g) in dichloromethane (100 ml). The mixture was stirred at 0°C for 2 hours and allowed to stand at room temperature overnight. The resultant solution was washed with water (30 ml × 3), dried over magnesium sulfate and evaporated under reduced pressure to give 1-methylcyclohexyl p-nitrophenyl carbonate as an oil; yield 66 g. Rf value 0.73 in thin-layer chromatography on silica gel with a solvent system of benzene:ethyl acetate (8:3 by volume).

EXAMPLE 3

Preparation of 1-methylcyclohexyl pentachlorophenyl carbonate

In the same manner as above, 1-methylcyclohexyl pentachlorophenyl carbonate was obtained as a viscous oil from 1-methylcyclohexanol (2.86 g) and pentachlorophenyl chloroformate (8.23 g); yield 7.70 g, Rf value 0.80 in thin-layer chromatography on silica gel with the solvent system of benzene:ethyl acetate (8:3 by volume).

EXAMPLE 4

Preparation of 1-methylcyclohexyl carbazate and 1-methylcyclohexyl azidoformate a. 100% Hydrazine hydrate (19.4 ml) was added to 1-methylcyclohexyl phenyl carbonate (43 g) obtained as in EXAMPLE 1 and the mixture was allowed to stand at room temperature overnight. An aqueous solution of sodium hydroxide (11.2 g) was added and the mixture was repeatedly extracted with ether (75 ml × 5). The ethereal solutions were combined, washed with 2N sodium hydroxide (50 ml × 3), dried over magnesium sulfate and evaporated under reduced pressure to give an oil, which was distilled under reduced pressure to give 1-methylcyclohexyl carbazate; yield 25.2 g, b.p. 112°–114°C (5 mmHg).

Anal. Calcd. for $C_8H_{16}N_2O_2$: C, 55.79; H, 9.36; N, 16.27. Found: C, 55.82; H, 9.39; N, 16.12.

b. 100% Hydrazine hydrate (19.4 ml) was added to 1-methylcyclohexyl p-nitrophenyl carbonate (66 g) obtained as in EXAMPLE 2, and the mixture was allowed to stand at room temperature for 2.5 hours, during which time p-nitrophenol separated and the whole solidified. The desired carbazate was repeatedly extracted with ether. The ethereal solutions were combined, washed with 2N sodium hydroxide (40 ml × 3), dried over magnesium sulfate and evaporated under reduced pressure to give 1-methylcyclohexyl carbazate as an oil, which was distilled under reduced pressure to give 1-methylcyclohexyl carbazate; yield 26.6 g, b.p. 115°–117°C(5 mmHg).

Anal. Calcd. for $C_8H_{16}N_2O_2$: C, 55.79; H, 9.36; N, 16.27. Found: C, 55.93; H, 9.72; N, 16.30.

On using 1-methylcyclohexyl pentachlorophenyl carbonate in the same manner as above, 1-methylcyclohexyl carbazate was obtained.

1-Methylcyclohexyl carbazate (2.58 g) obtained as above was mixed with acetic acid (1.7 ml) and water (2.5 ml), and the mixture was chilled in an ice bath. To the mixture was added a solution of sodium nitrite (1.14 g) in water (2 ml) very slowly and the mixture was stirred at 0°C for 30 minutes. The oily azide which deposited upon addition of water (5 ml) was extracted three times with ether. The ethereal solutions were combined, washed with M sodium bicarbonate, dried over magnesium sulfate and evaporated under reduced pressure at a bath temperature of 18°C to yield 1-methylcyclohexyl azidoformate as a colorless oil with a characteristic odor; yield 2.82 g. This azidoformate was used without further purification in the acylation of amino acids or peptides.

EXAMPLE 5

Preparation of 1-methylcyclopentyl p-nitrophenyl carbonate

In the same manner as in EXAMPLE 2, 1-methylcyclopentanol (10.0 g) was treated with p-nitrophenyl chloroformate (20.2 g) to give 1-methylcyclopentyl p-nitrophenyl carbonate as an oil; yield 30.0 g, Rf value 0.73 in thin-layer chromatography on silica gel in a solvent system of benzene:ethyl acetate (8:3 by volume).

EXAMPLE 6

Preparation of 1-methylcyclopentyl azidoformate

The carbonate (30.0 g) obtained in EXAMPLE 5 was allowed to react with hydrazine hydrate in the same manner as in EXAMPLE 4 to give 1-methylcyclopentyl carbazate as an oil; yield 12.8 g, b.p. 110°–111°C (7 mmHg).

Anal. Calcd. for $C_7H_{14}N_2O_2$: C, 53.14; H, 8.92; N, 17.71. Found: C, 53.34; H, 8.67; N, 17.49.

Treatment of the carbazate with sodium nitrite in a similar manner to that described in EXAMPLE 4 gave 1-methylcyclopentyl azidoformate as an oil; yield 12.5 g. The azidoformate was used without further purification.

II: N-(1-Alkylcycloalkyloxycarbonyl)-amino acids and -peptides

EXAMPLE 7

Preparation of N-(1-methylcyclohexyloxycarbonyl)-L-phenylalanine (dicyclohexylamine salt)

a. Acylation with azidoformate: 1-Methylcyclohexyl azidoformate (2.82 g) was dissolved in dioxane (10 ml) and the solution was added to a mixture of L-phenylalanine (1.65 g), N sodium hydroxide (20 ml), sodium bicarbonate (1.70 g) and dioxane (10 ml) at 45°C and the mixture was stirred at this temperature for 41 hours. After removal of the solvent by evaporation under reduced pressure, the residue was chilled and acidified with ice-cold 4N hydrochloric acid in the presence of ethyl acetate (10 ml). The aqueous layer was extracted with cold ethyl acetate. The organic extracts were combined, dried over magnesium sulfate and evaporated under reduced pressure. The residue (2.45 g) was dissolved in ether, and to the solution was added dicyclohexylamine (1.6 ml). The crystalline amine salt which separated upon cooling was collected by filtration, washed with cold ether and dried under reduced pressure. Recrystallization from ethanol-ethyl acetate gave N-(1-methylcyclohexyloxycarbonyl)-L-phenylalanine dicyclohexylamine salt; yield 3.47 g, m.p. 184°–185°C (decomp.), $[\alpha]_D^{22} + 26.5 \pm 0.7°$ (c 1.0, methanol).

Anal. Calcd. for $C_{17}H_{23}NO_4.C_{12}H_{23}N$: C, 71.57; H, 9.53; N, 5.76. Found: C, 71.56; H, 9.45; N, 5.80.

b. Acylation with pentachlorophenyl carbonate: L-Phenylalanine methyl ester hydrochloride (2.16 g) was dissolved in dimethylformamide (10 ml), and to the solution was added triethylamine (2.80 ml). Triethylamine hydrochloride which separated was removed by filtration and the filtrate was combined with a dimethylformamide solution of 1-methylcyclohexyl pentachlorophenyl carbonate (4.0 g) obtained as in EXAMPLE 3. The mixture was allowed to stand at room temperature for 4.5 days. The solvent was removed by evaporation under reduced pressure at a bath temperature of 45°C and the residue was dissolved in ethyl acetate. The solution was chilled in ice, washed with ice-cold N hydrochloric acid and water, then washed with 2M sodium carbonate several times to remove the by-produced phenol. The resulting solution was dried over magnesium sulfate and evaporated under reduced pressure to yield N-(1-methylcyclohexyloxycarbonyl)-L-phenylalanine methyl ester as an oil (2.76 g). The methyl ester thus obtained was dissolved in methanol (25 ml), and 2N sodium hydroxide (5 ml) was added. The mixture was shaken at room temperature for 60 minutes, then neutralized with N hydrochloric acid (10 ml) at 0°C. After removal of methanol by evaporation under reduced pressure, the residue was chilled in an ice bath and acidified with ice-cold 4N hydrochloric acid in the presence of ethyl acetate. The aqueous phase was extracted with ethyl acetate. The oraganic solutions were combined, dried over magnesium sulfate and evaporated under reduced pressure. The resulting residue was dissolved in ether and to the solution was added dicyclohexylamine (1.7 ml) to give N-(1-methylcyclohexyloxycarbonyl)-L-phenylalanine dicyclohexylamine salt, which was recrystallized from ethanolethyl acetate; yield 2.90 g, m.p. 184–185°C (decomp.), $[\alpha]_D^{21.5} + 26.6 \pm 0.7°$ (c 1.0, methanol).

Anal. Calcd, for $C_{17}H_{23}NO_4. C_{12}H_{23}N$: C, 71.57; H, 9.53; N, 5.76. Found: C, 71.56; H, 9.49; N, 6.03.

By this procedure, use of 1-methylcyclohexyl p-nitrophenyl carbonate also gave an identical compound.

c. Isocyanate method: L-Phenylalanine methyl ester hydrochloride (1.08 g) was suspended in anhydrous toluene (15 ml), and dry phosgene was bubbled into the suspension at a bath temperature of 120°–130°C for 90 minutes. The resulting clear solution was evaporated under reduced pressure to give carbonyl-L-phenylalanine methyl ester as an oil. To this were added 1-methylcyclohexanol (0.52 g) and pyridine (2 ml), and the mixture was heated under reflux for 2 hours. The solvent was removed by evaporation under reduced pressure and the dark colored residue was dissolved in chloroform and applied to a column of silica gel (20 g, 0.05–0.2 mm, E.Merck), which had been prepared in chloroform. The column was eluted with chloroform containing 1% methanol. The first 100 ml-fraction was found by thin-layer chromatography to contain the desired product, N-(1-methylcyclohexyloxycarbonyl)-L-phenylalanine methyl ester, which was obtained as an oil by evaporation under reduced pressure; yield 1.15 g.

The methyl ester obtained above was dissolved in methanol (10 ml) and to the solution was added 2N sodium hydroxide (3 ml). The mixture was shaken at room temperature for 60 minutes. After removal of methanol by evaporation the residue was chilled in an ice bath and acidified with cold N hydrochloric acid in the presence of ethyl acetate at 0°C. The aqueous phase was extracted with ethyl acetate. The organic solutions were combined, dried over magnesium sulfate and evaporated under reduced pressure. The resulting residue was dissolved in ether and to the solution was added dicyclohexylamine (10 ml) to give M-(1-methylcyclohexyloxycarbonyl)-L-phenylalanine dicyclohexylamine salt, which was recrystallized from methanol-ether; yield 1.08 g, m.p. 184°–186°C (decomp), $[\alpha]_D^{25}+26.1\pm0.7°$ (c 1.0, methanol).

Anal. Calcd. for $C_{17}H_{23}NO_4 \cdot C_{12}H_{23}N$: C, 71.57; H, 9.53; N, 5.76. Found: C, 71.80; H, 9.48; N, 5.66.

EXAMPLE 8

Preparation of N-(1-methylcyclohexyloxycarbonyl)-glycine

Glycine (1.13 g) was acylated with 1-methylcyclohexyl azidoformate (derived from 15 mmoles of the corresponding carbazate obtained as in EXAMPLE 4) in the same manner as in EXAMPLE 7 to give N-(1-methylcyclohexyloxycarbonyl)-glycine, which was recrystallied from ethyl acetate-petroleum ether; yield 2.27 g, m.p. 70–72°C.

Anal. Calcd. for $C_{10}H_{17}NO_4$: C, 55.80; H, 7.96; N, 6.51. Found: C, 55.66; H, 7.88; N, 6.74.

EXAMPLE 9

Preparation of N-(1-methylcyclohexyloxycarbonyl)-L-serine (dicyclohexylamine salt)

L-Serine (1.58 g) was acylated with 1-methylcyclohexyl azidoformate (prepared from 15 mmoles of the corresponding carbazate) in a similar manner to that described in EXAMPLE 7. The resultant acylated L-serine (oil, 2.10 g) was treated with dicyclohexylamine in the usual manner to give N-(1-methylcyclohexyloxycarbonyl)-L-serine dicyclohexylamine salt; yield 2.52 g, m.p. 128°–129°C, $[\alpha]_D^{23}+12.3\pm0.6°$ (c 1.0, methanol).

Anal. Calcd. for $C_{11}H_{19}NO_5 \cdot C_{12}H_{23}N$: C, 64.76; H, 9.92; N, 6.57. Found: C, 64.46; H, 9.48; N, 6.53.

EXAMPLE 10

Preparation of $N^\alpha$-(1-methylcyclohexyloxycarbonyl)-$N^G$-nitro-L-arginine $N^G$-Nitro-L-arginine (3.29 g) was acylated with 1-methylcyclohexyl azidoformate (derived from 15 mmoles of the carbazate) in the manner described above. The desired product was crystallized from ethyl acetate-petroleum ether; yield 2.00 g, m.p. 91°C (decomp.), $[\alpha]_D^{24}-1.5\pm0.5°$ (c=1.0, methanol).

Anal. Calcd. for $C_{14}H_{25}N_5O_6 \cdot \frac{1}{4}CH_3CO_2C_2H_5$: C, 47.24; H, 7.14; N, 18.36. Found: C, 47.28; H, 7.35; N, 18.54.

EXAMPLE 11

Preparation of $N^\epsilon$-(1-methylcyclohexyloxycarbonyl)-L-lysine

L-Lysine monohydrochloride (5.5 g) was dissolved in water (40 ml) and to the solution was added basic copper carbonate (5.5 g). The mixture was heated on a boiling water bath for 30 minutes and filtered with the aid of a Celite pad. To the filtrate was added magnesium oxide (1.6 g) and the mixture was stirred at 45°C. A solution of 1-methylcyclohexyl azidoformate (derived from 45 mmoles of the carbazate in the manner described above) in methanol (80 ml) was then added dropwise. The reaction mixture was stirred at the above temperature for 45 hours, then chilled in an ice bath. After addition of 2N acetic acid (27 ml), the precipitate which separated was collected by filtration, washed with water and dried under reduced pressure to yield the copper complex of $N^\epsilon$-(1-methylcyclohexyloxycarbonyl)-L-lysine; yield 6.9 g.

A suspension of the copper complex (6.9 g) in water (100 ml) was chilled in ice, and 2N aqueous amonia (25 ml) was introduced. The mixture was stirred at 0°C in a gentle stream of hydrogen sulfide for 2 hours. There was then added 2N acetic acid (35 ml) very carefully. The precipitates of copper sulfide were filtered off through a Celite pad and the filtrate was concentrated under reduced pressure to afford $N^\epsilon$-(b 1-methylcyclohexyloxycarbonyl)-L-lysine as a colorless solid, which showed a single ninhydrin reactive spot in thin-layer chromatography (n-butanol/acetic acid/water=18/2/5, v/v). The product was reprecipitated from water; yield 5.45 g, m.p. 184°–188°C (decomp.), $[\alpha]_D^{22}+3.0\pm0.5°$ (c 1.0, water).

EXAMPLE 12

Preparation of N-(1-methylcyclopentyloxycarbonyl)-L-phenylalanine (dicyclohexylamine salt)

L-Phenylalanine (1.65 g) was dissolved in N sodium hydroxide (10 ml) and to the solution were added sodium bicarbonate (1.7 g) and dioxane (5 ml). A solution of 1-methylcyclopentyl azidoformate (prepared from 2.38 g of the carbazate in the same manner as EXAMPLE 6) in dioxane (5 ml) was then added at a bath temperature of 45°C and the mixture was stirred at the same temperature for 24 hours. The solvent was removed by evaporation under reduced pressure to give a residue, which was chilled and acidified with ice-cold 4N hydrochloric acid in the presence of ethyl acetate (20 ml). The aqueous phase was extracted three times with ice-cold ethyl acetate. The organic extracts were combined, dried over magnesium sulfate and evaporated under reduced pressure. The residue (1.28 g) was dissolved in ether and to the solution was added dicyclohexylamine (0.87 ml). The crystalline amine salt which separated was collected by filtration, washed with ether and dried under reduced pressure to give N-(1-methylcyclopentyloxycarbonyl)-L-phenylalanine dicyclohexylamine salt, which was recrystallized from ethanol; yield 1.52 g, m.p. 203°–205°C (decomp.), $[\alpha]_D^{21}+26.9\pm0.7°$ (c 1.0, methanol).

Anal. Calcd. for $C_{16}H_{21}NO_4 \cdot C_{12}H_{23}N$: C, 71.15; H, 9.38; N, 5.93. Found: C, 71.09; H, 9.45; N, 5.96.

EXAMPLE 13

Preparation of N-(1-methylcyclopentyloxycarbonyl)-L-phenylalanine(dicyclohexylamine salt)

Carbonyl-L-phenylalanine methyl ester [derived from L-phenylalanine methyl ester hydrochloride (1.08 g)] was allowed to react with 1-methylcyclopentanol (0.45 g) in pyridine to give N-(1-methylcyclopentyloxycarbonyl)-L-phenylalanine methyl ester. Saponification of the methyl ester, followed by treatment with dicyclohexylamine, gave the desired compound; yield 1.16 g, m.p. 203°–205°C (decomp), $[\alpha]_D^{25}$+27.0±0.7° (c 1.0 methanol).

Anal. Calcd. for $C_{16}H_{21}NO_4 \cdot C_{12}H_{23}N$: C, 71.15; H, 9.38; N, 5.93. Found: C, 71.30; H, 9.48; N, 5.66.

In the same manner as above, but by using 1-methylcyclohexanol, there were obtained the following compounds: N-(1-methylcyclohexyloxycarbonyl)-glycine [m.p. 70°-71°C], N-(7-methylcyclohexylcarbonyl)-L-serine dicyclohexylamine salt [m.p. 128°–129°C, $[\alpha]_D^{24}$+12.4±0.5° (c 1.0, methanol)], and $N^\alpha$ -(1-methylcyclohexyloxycarbonyl)-$N^G$-nitro-L-arginine [m.p. 90°C (decomp.), $[\alpha]_D^{23}$−1.7±0.4° (c 1.0, methanol)].

EXAMPLE 14

Preparation of $N^\alpha$ -benzyloxycarbonyl-$N^\epsilon$ -(1-methylcyclohexyloxycarbonyl)-L-lysine (dicyclohexylamine salt)

A solution of $N^\epsilon$ -(1-methylcyclohexyloxycarbonyl)-L-lysine (1.43 g) in N sodium hydroxide (10 ml) was chilled in an ice bath and sodium bicarbonate (0.85 g) was added. To this was added dropwise benzyl chloroformate (0.94 g) and the mixture was stirred at 0°C for 3 hours, after which time the excess reagent was removed by extraction with ether. The resultant mixture was acidified with ice-cold 4N hydrochloric acid in the presence of ether. The aqueous phase was extracted twice with ether. The ether solutions were combined, washed with ice-cold N hydrochloric acid and water, dried over magnesium sulfate and evaporated under reduced pressure. The residue was dissolved in ether and to the solution was added dicyclohexylamine (1 ml). The crystals which separated upon refrigeration overnight were collected by filtration, washed with cold ether and dried. Recrystallization from methanol-ether yielded 2.62 g, m.p. 94°–96°C, $[\alpha]_D^{24}$+4.9±0.5° (c 1.0, methanol).

Anal. Calcd. for $C_{22}H_{32}N_2O_6 \cdot C_{12}H_{23}N$: C, 67.85; H, 9.21, N, 6.98. Found: C, 67.83; H, 9.13; N, 7.07.

EXAMPLE 15

Preparation of $N^\alpha$ -benzyloxycarbonyl-$N^\epsilon$ -(1-methylcyclohexyloxycarbonyl)-L-lysyl-L-prolyl-L-valyl-glycine methyl ester The dicyclohexylamine salt (2.41 g) obtained in EXAMPLE 14 was shaken with Dowex 50 w x8(H× form, 4 cc) in 60% ethanol for 30 minutes. After removal of the resin by filtration the filtrate was evaporated under reduced pressure at a bath temperature of 45°C. The residue was dissolved in ether and the solution was dried over magnesium sulfate and evaporated under reduced pressure to afford the diacyl-L-lysine (free acid) as a sirupy residue (1.7 g). This was dissolved in dichloromethane together with L-prolyl-L-valylglycine methyl ester (1.14 g) [prepared according to the method described in Bull.Chem.Soc.Japan 37, 1471 (1964)] and a dichloromethane solution of N,N'-dicylohexylcarbodiimide (0.83 g) was added at 0°C. The reaction mixture was kept at 4°C overnight and then worked up by the usual method to give the desired tetrapeptide, which was precipitated from ether. Reprecipitation from ethyl acetate-petroleum ether afforded a pure preparation with an optical rotation of $[\alpha]_D^{24}$−73.6±1.2° (c 1.0, methanol).

Anal. Calcd. for $C_{35}H_{53}N_5O_9$: C, 61.12; H, 7.77; N, 10.18. Found: C, 61.40; H, 7.68; N, 10.01.

EXAMPLE 16

Preparation of $N^\alpha$ -benzyloxycarbonyl-$N^\epsilon$ -(1-methylcyclohexyloxycarbonyl)-L-lysyl-L-prolyl-L-valyl-glycine The acyl tetrapeptide ester (1.38 g) obtained in the preceeding EXAMPLE was dissolved in methanol (5 ml) and to the solution was added 2N sodium hydroxide (2 ml). The mixture was shaken at room temperature for 60 minutes then chilled in an ice bath. Water (10 ml) and ethyl acetate (15 ml) were added and the mixture was acidified with ice-cold N hydrochloric acid. The aqueous phase was extracted with cold ethyl acetate. The organic solutions were combined, washed with ice-cold N hydrochloric acid, dried over magnesium sulfate and evaporated under reduced pressure to give a foamy residue, which was precipitated from ethyl acetate-ether. Reprecipitation from the same solvent yielded a pure preparation of the desired compound which behaved as a single component in thin-layer chromatography (in chloroform/methanol/acetic acid = 90/10/3, v/v); yield 1.26 g, $[\alpha]_D^{22}$−71.1±1.1° (c 1.0, methanol).

Anal. Calcd. for $C_{34}H_{51}N_5O_9 \cdot \frac{1}{2}H_2O$: C, 59.81; H, 7.68; N, 10.26. Found: C, 59.97; H, 7.84; N, 9.92.

EXAMPLE 17

Preparation of $N^\alpha$ -benzyloxycarbonyl-$N^\epsilon$ -(1-methylcyclohexyloxycarbonyl)-L-lysyl-L-prolyl-L-valyl-glycyl-$N^\epsilon$ -(1-methylcyclohexyloxycarbonyl)-L-lysine methyl ester $N^\alpha$ -Benzyloxycarbonyl-$N^\epsilon$ -(1-methylcyclohexyloxycarbonyl)-L-lysine (prepared from 1.5 mmoles of the dicyclohexylamine salt in the manner described in EXAMPLE 15) was dissolved in ether (10 ml) and to the solution was added an ethereal solution of diazomethane at 0°C until the yellow color persited. The solution was kept at 0°C for 30 minutes then a few drops of acetic acid were added to decompose the excess diazomethane. The solution was then washed with M sodium bicarbonate, dried over magnesium sulfate and evaporated under reduced pressure to yield the methyl ester of the diacyl-L-lysine as a sirupy residue which behaved as a single component in thin-layer chromatography (in methanol/chloroform = 2/8, v/v).

The diacyl-lysine methyl ester (0.69 g) obtained above was hydrogenolysed in methanol (10 ml) over palladium at room temperature for 2 hours in the presence of acetic acid (2.5 ml). After removal of the solvent by evaporation under reduced pressure, the oily residue was dissolved in dichloromethane and the solution was shaken with ice-cold 50% potassium carbonate at 0°C to obtain the free base of $N^\epsilon$ -(1-methylcyclohexyloxycarbonyl)-L-lysine methyl ester as a sirupy residue (0.53 g). This was dissolved in dichloromethane (10 ml) together with $N^\alpha$-benzyloxycarbonyl-$N^\epsilon$-(1-methylcyclohexyloxycarbonyl)-L-lysyl-L-prolyl-L-valyl-glycine (0.91 g), and a dichloromethane solution of dicyclohexylcarbodiimide (0.31 g) was added at 0°C. The mixture was kept at 4°C overnight and then worked up in the usual manner to isolate the desired pentapeptide derivative, which separated as gelatinous precipitates from an ethereal solution. The product behaved as a single component in thin-layer chromatography with a solvent system of methanol:chloroform (1:9, v/v). Reprecipitation was carried out from ethyl acetate-ether; yield 1.08 g, $[\alpha]_D^{25}$—49.7±1.0° (c 1.0, methanol).

Anal. Calcd. for $C_{49}H_{77}N_7O_{12}$: C, 61.55; H, 8.12; N, 10.25. Found: C, 61.60; H, 8.26; N, 10.00.

EXAMPLE 18

Preparation of $N^\alpha$-benzyloxycarbonyl-$N^\epsilon$-(1-methylcyclohexyloxycarbonyl)-L-lysyl-L-prolyl-L-valyl-glycine-$N^\epsilon$-(1-methylcyclohexyloxycarbonyl)-L-lysine hydrazide The pentapeptide derivative (0.72 g), obtained in EXAMPLE 17, was dissolved in methanol (6 ml), hydrazine hydrate (0.4 ml) was added, and the mixture kept at room temperature for 18 hours. The hydrazide was precipitated by the addition of a large amount of ether. The gelatinous precipitate was collected by filtration, washed with ether and dried over sulfuric acid under reduced pressure. Reprecipitation from methanol-ether afforded a pure preparation; yield 0.67 g, $[\alpha]_D^{24}$—51.6±0.9° (c 1.0, methanol).

Anal. Calcd. for $C_{48}H_{77}N_9O_{11}$: C, 60.29; H, 8.12; N, 13.18. Found: C, 60.34; H, 8.25; N, 13.16.

EXAMPLE 19

Preparation of $N^\alpha$-benzyloxycarbonyl-$N^\epsilon$-(1-methylcyclohexyloxycarbonyl)-L-lysyl-$N^G$-nitro-L-arginyl-$N^G$-nitro-L-arginine amide To a solution of $N_G$-nitro-L-arginyl-$N^G$-nitro-L-arginine amide hydrobromide (0.54 g) [prepared according to the method described in Bull.Chem.Soc.Japan 39, 882 (1966)], and triethylamine (0.28 ml) in dimethylformamide (5 ml) was added a solution of N-α-benzyloxycarbonyl-$N^\epsilon$-(1-methylcyclohexyloxycarbonyl)-L-lysine N-hydroxysuccinimide ester (0.52 g) [prepared from the said diacyl-lysne and N-hydroxysuccinimide by condensation using dicyclohexylcarbodiimide] dissolved in dimethylformamide (2 ml). The mixture was kept overnight at 0°C. After removal of the solvent by evaporation under reduced pressure the residue was dissolved in n-butanol-ethyl acetate (1:3, v/v). The solution was washed with ice-cold N hydrochloric acid, water, and M sodium bicarbonate, dried over magnesium sulfate and evaporated under reduced pressure to give a residue, which was precipitated from n-butanol. Reprecipitation from methanol-n-butanol yielded a pure preparation of the desired tripeptide; yield 0.7 g, $[\alpha]_D^{25}$ — 15.3 ±0.6° (c 1.0, methanol).

Anal. Calcd. for $C_{34}H_{55}N_{13}O_{11}$: C, 49.69; H, 6.75; N, 22.16. Found: C, 49.28; H, 6.91; N, 21.59.

EXAMPLE 20

Preparation of N-(1-methylcyclohexyloxycarbonyl)-L-phenylalanyl-L-phenylalanine methyl ester N-(1-Methylcyclohexyloxycarbonyl)-L-phenylalanine dicyclohexylamine salt (0.97 g) obtained as in EXAMPLE 7 was shaken with Dowex 50W × ($H^+$ form, 5 cc) in 60% ethanol at room temperature for 30 minutes to give the free acid. This was then coupled with L-phenylalanine methyl ester (derived from 2 moles (0.43 g) of the hydrochloride by neutralization with 50% aqueous potassium carbonate in the presence of dichloromethane) by means of the dicyclohexylcarbodiimide method in dichloromethane. The reaction mixture was worked up by the usual method involving washes with N hydrochloric acid and sodium bicarbonate solution to yield the desired dipeptide. The product was recrystallized from ethyl acetate-petroleum ether; yield 0.88 g, m.p. 119°–120°C, $[\alpha]_D^{25}$—13.9±0.4° (c 1.0, methanol).

Anal. Calcd. for $C_{27}H_{43}N_2O_5$: C, 69.50; H, 7.35; N, 6.00. Found: C, 69.60; H, 7.45; N, 5.92.

EXAMPLE 21

Preparation of N-(1-methylcyclopentyloxycarbonyl)-L-phenylalanyl-L-phenylalanine methyl ester A suspension in ether (10 ml) of N-(1-methylcyclopentyloxycarbonyl)-L-phenylalanine dicyclohexylamine salt (0.95 g), obtained as in EXAMPLE 12 or 13, was shaken with ice-cold M citric acid (7 ml) until the solid disappeared. The ethereal solution was washed with water, dried over magnesium sulfate and evaporated under reduced pressure to give the free acid as a sirupy residue. This was then coupled with L-phenylalanine methyl ester (derived from 2 mmoles of the hydrochloride by the usual method) by the dicyclohexylcarbodiimide method in dichloroethane. The dicyclohexylurea which separated was removed by filtration, and the filtrate was evaporated under reduced pressure. The resultant solid residue was dissolved in ethyl acetate and the solution was washed with ice-cold M citric acid, water and M sodium bicarbonate, dried over magnesium sulfate and evaporated under reduced pressure. The crystalline residue was recrystallized twice from ethyl acetate-petroleum ether to afford the desired product as needles; yield 0.78 g, m.p. 116°–117°C, $[\alpha]_D^{26}$—14.3±0.6° (c 1.0, methanol).

Anal. Calcd. for $C_{26}H_{32}N_2O_5$: C, 69.00; H, 7.13; N, 6.19. Found: C, 69.24; H, 7.17; N, 5.98.

III: Preferential removal of protecting groups

EXAMPLE 22

Preparation of L-phenylalanyl-L-phenylalanine methyl ester hydrochloride

N-(1-Methylcyclohexyloxycarbonyl)-L-phenylalanyl-L-phenylalanine methyl ester (0.20 g) obtained as in EXAMPLE 20 was dissolved in N hydrogen chloride/acetic acid (2 ml), and the solution was allowed to stand at room temperature for 30 minutes. After removal of the solvent by evaporation under reduced pressure the residue was treated with ether to yield the desired dipeptide hydrochloride as needles. The crystals were recrystallized from methanol-ether; yield 0.152 g, m.p. 201°–202°C (decomp.), $[\alpha]_D^{25}$+6.5±0.5° (c 1.0, methanol).

EXAMPLE 23

Preparation of L-phenylalanyl-L-phenylalanine methyl ester formate

N-(1-Methylcyclopentyloxycarbonyl)-L-phenylalanyl-L-phenylalanine methyl ester (0.20 g) obtained as in EXAMPLE 21 was dissolved in formic acid (2 ml) and the solution was kept at room temperature for 30 minutes. After removal of the solvent by evaporation under reduced pressure at a bath temperature of 40°C, the residue was treated with ether to give a gelatinous precipitate of the desired dipeptide formate, which crystallized upon cooling with ice. Recrystallization from ethanol yielded 0.165 g, m.p. 112°–115°C, $[\alpha]_D^{25}+3.8\pm0.5°$ (c 1.0, methanol).

IV: Kinetics of acidolytic removal of amino-protecting groups

EXAMPLE 24

Kinetics of acidolytic removal of the present amino-protecting groups was examined in comparison with that of a typical known amino-protecting group, t-butyloxycarbonyl group, which is removable by mild acid solvolysis.

Test Compounds: N-(1-methylcyclohexyloxycarbonyl)-L-phenylalanine dicyclohexylamine salt (Mhoc-Phe-OH.DCHA), N-(1-methylcyclohexyloxycarbonyl)-L-phenylalanyl-L-phenylalanine methyl ester (Mhoc-Phe.Phe-OMe), N-(1-methylcyclopentyloxycarbonyl)-L-phenylalanine dicyclohexylamine salt (Mpoc-Phe-OH.DCHA), N-(1-methylcyclopentyloxycarbonyl)-L-phenylalanyl-L-phenylalanine methyl ester (Mpoc-Phe.Phe-OMe), N-(t-butyloxycarbonyl)-L-phenylalanyl-L-phenylalanine methyl ester (Boc-Phe.Phe-OMe).

METHODS

A. By means of optical rotation measurement:

A test compound (20 mg) was made up to 1 ml by the addition of formic acid. The solution was immediately placed in a cell and its optical rotation was measured at 25°C in constant time-intervals to determine the concentration of the test compound remaining in the acid medium. Rate constant of the acidolysis was calculated from the following equation:

$$\frac{dx}{dt} = k_1 (a-x) \rightarrow k_1 = \frac{1}{t} \ln(a/a-x) = \frac{2.303}{t} \log(a/a-x)$$

wherein $k_1$ is a first-order rate constant; $a$ is an initial concentration of the test compound; and $x$ is an amount that has undergone the reaction in time $t$. Also, a half-life ($\tau$) of the protecting group in the acidolysis was determined from the above equation when $x$ is $a/2$, i.e. the equation:

$$\frac{\ln 2}{k_1} = \frac{(2.303 \log 2)}{k_1}$$

B. By means of potentiometric titration:

A test compound (0.2 mmole) was made up to 2 ml by the addition of 80% formic acid and the mixture was kept at 25°C. An aliquot (0.2 ml) was withdrawn from the mixture at fixed time-intervals and diluted with glacial acetic acid (1.5 ml). The diluted solution was immediately titrated with 0.02N perchloric acid/acetic acid to determine the concentration of the amino group liberated. The data thus obtained were submitted to the calculation of kinetic parameters using the above equation.

Results:

| Acid<br>Test Compound | HCOOH | 80% HCOOH |
|---|---|---|
| | Method A | Method B |
| Mhoc-Phe-OH.DCHA | $k_1=1.15\times10^{-1}$<br>$\tau=6.03$ | — |
| Mhoc-Phe.Phe-OMe | $k_1=1.24\times10^{-1}$<br>$\tau=5.59$ | $k_1=3.46\times10^{-2}$<br>$\tau=20$ |
| Mpoc-Phe-OH.DCHA | $k_1=2.53\times10^{-1}$<br>$\tau=2.74$ | — |
| Mpoc-Phe.Phe-OMe | $k_1=6.16\times10^{-1}$<br>$\tau=1.13$ | $k_1=2.40\times10^{-1}$<br>$\tau=2.89$ |
| Boc-Phe.Phe-OMe | $k_1=1.09\times10^{-1}$<br>$\tau=6.36$ | $k_1=2.48\times10^{-2}$<br>$\tau=27.9$ |

Note: $k_1$: min$^{-1}$; $\tau$: min.

From the data obtained above the susceptibility of the amino-protecting groups towards acids can be ranked in the order: Mpoc>Mhoc=Boc.

What we claim is:
1. 1-methylcyclohexyl azidoformate.
2. 1-methylcyclopentyl azidoformate.

* * * * *